(12) United States Patent
Liang

(10) Patent No.: US 7,704,049 B1
(45) Date of Patent: Apr. 27, 2010

(54) TBC ATTACHMENT CONSTRUCTION FOR A COOLED TURBINE AIRFOIL AND METHOD OF FORMING A TBC COVERED AIRFOIL

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 699 days.

(21) Appl. No.: 11/636,237

(22) Filed: Dec. 8, 2006

(51) Int. Cl.
*B64C 11/24* (2006.01)
*F01D 5/18* (2006.01)

(52) U.S. Cl. ............... 416/224; 416/229 A; 416/241 R; 428/116; 428/137

(58) Field of Classification Search ................. 415/115; 416/97 R, 224, 229 R, 241 A, 241 B, 241 R, 416/229 A; 29/889.1, 889.2; 428/116, 137
See application file for complete search history.

(56) References Cited

U.S. PATENT DOCUMENTS

| | | | |
|---|---|---|---|
| 3,647,316 A | 3/1972 | Moskowitz | |
| 3,810,711 A | 5/1974 | Emmerson et al | |
| 4,075,364 A | 2/1978 | Panzera | |
| 4,338,380 A | 7/1982 | Erickson et al. | |
| 4,629,397 A | 12/1986 | Schweitzer | |
| 5,137,852 A * | 8/1992 | Morgan et al. | 501/95.2 |
| 6,428,280 B1 | 8/2002 | Austin et al. | |
| 6,551,061 B2 | 4/2003 | Darolia et al. | |
| 6,599,568 B2 * | 7/2003 | Lee et al. | 427/230 |
| 6,602,053 B2 * | 8/2003 | Subramanian et al. | 416/97 R |
| 6,617,003 B1 | 9/2003 | Lee et al. | |
| 6,709,230 B2 | 3/2004 | Morrison et al. | |
| 6,720,087 B2 * | 4/2004 | Fried et al. | 428/614 |
| 7,402,335 B2 * | 7/2008 | Bolms et al. | 428/310.5 |

* cited by examiner

*Primary Examiner*—Edward Look
*Assistant Examiner*—Sean J Younger
(74) *Attorney, Agent, or Firm*—John Ryznic

(57) ABSTRACT

A TBC covered substrate, such as an airfoil used in a gas turbine engine, the substrate has a plurality of open cells formed thereon with the cell walls being formed by ribs arranged to form substantially rectangular shaped cells. The walls or ribs or the cells have cross-over holes formed at about the mid-point of the cell wall and a wire band is passed through the cross-over holes and extends through the cells. A TBC is sprayed into the cells to fill the cell and cover the wire band such that the wire band functions to reinforce the TBC. The cell floors include at least one cooling air feed hole and the TBC is a porous material such that cooling air passing through the feed holes will also pass through the TBC. During the process of forming the airfoil with the TBC covered, air is passed through the feed holes while the TBC is being applied to prevent the feed holes from being blocked by the TBC.

18 Claims, 2 Drawing Sheets

TBC ATTACHMENT CONSTRUCTION FOR A COOLED TURBINE AIRFOIL AND METHOD OF FORMING A TBC COVERED AIRFOIL

CROSS-REFERENCE TO RELATED APPLICATIONS

This application is related to U.S. patent application Ser. No. 11/183,134 filed on Jul. 15, 2005 and entitled AIRFOIL HAVING POROUS METAL FILLED CAVITIES; and U.S. patent application Ser. No. 11/140,059 filed on May 5, 2005 and entitled AIRFOIL WITH A POROUS METAL LAYER; and U.S. patent application Ser. No. 11/337,880 filed on Jan. 21, 2006 and entitled TURBINE AIRFOIL WITH FIBROUS REINFORCED TBC. These three related applications and the present invention all share a common assignee.

BACKGROUND OF THE INVENTION

1. Field of the Invention

The present invention relates generally to thermal barrier coatings, and more specifically to a TBC on a turbine airfoil.

2. Description of the Related Art Including Information Disclosed Under 37 CFR 1.97 and 1.98

A gas turbine engine, such as an aero engine used to power an aircraft and an industrial gas turbine engine used to produce electric power, includes a turbine section with a plurality of stages of stator vanes interspersed with an equal number of stages of rotor blades to extract energy from a hot gas flow passing through. It is well known that the efficiency of the engine can be increased by providing for a higher gas flow into the turbine. However, the turbine, especially the first stage stator vanes and rotor blades, limit how high the gas flow temperature can be. If the temperature is too high, these airfoils can be severally damaged.

Thus, airfoil designers attempt to provide the airfoils with complex internal air cooling passages to allow for these airfoils to be exposed to higher temperatures, or apply thermal barrier coatings (TBC) to the outside surface that is exposed to the high temperature gas flow in order to protect the airfoil. A combination of air cooling and TBC is used to allow for higher temperatures. In the prior art, a thin TBC is used in the turbine airfoil cooling design to provide insulation for the airfoil for the reduction of heat load from the hot gas flow to the airfoil which reduces the airfoil metal temperature and therefore reduces the cooling flow consumption and improves the turbine efficiency. As the turbine inlet temperature increases, the cooling flow demand for cooling the airfoil will increase and therefore reduce the turbine efficiency. One method of reducing the cooling air consumption while increasing the turbine inlet temperature for higher turbine efficiency is by using thicker TBC on the cooled airfoil surface. The cooling design becomes more reliant on the coating's endurance, and the TBC becomes the "prime reliance" in the cooling design. The problem with this approach is that a thicker TBC increases the chance of spallation.

A TBC applied to the airfoil surface is typically about 0.4 mm in thickness and has no reinforcement. A thicker layer of TBC would provide better insulation to the airfoil surface, but using a thicker layer than this would produce spallation in the TBC. Spallation is when ships of the TBC break away and leave holes in the insulation. U.S. Pat. No. 6,428,280 B1 issued to Austin et al on Aug. 6, 2002 entitled STRCUTURE WITH CERAMIC FOAM THERMAL BARRIER COATING, AND ITS PREPARATION shows this typical TBC on an airfoil surface.

U.S. Pat. No. 6,551,061 B2 issued to Darolia et al on Apr. 22, 2003 entitled PROCESS FOR FORMING MICRO COOLING CHANNELS INSIDE A THERMAL BARRIER COATING SYSTEM WITHOUT MASKING MATERIAL and U.S. Pat. No. 6,617,003 B1 issued to Lee et al on Sep. 9, 2003 entitled DIRECLTY COOLED THERMAL BARRIER COATING SYSTEM both show turbine airfoil with TBC applied thereto that make use of cooling channels formed under or partial with the TBC layer to provide extra cooling for the TBC. However, none of these two patents provide any reinforcement that will allow for a thicker layer of the TBC.

U.S. Pat. No. 4,629,397 issued to Schweitzer on Dec. 16, 1986 entitled STRUCTURAL COMPONENT FOR USE UNDER HIGH THERMAL LOAD CONDITIONS shows a turbine airfoil with unobstructed cooling ducts arranged along the airfoil in the spanwise direction with an air permeable metal felt layer and an air impermeable ceramic layer formed on top of the ducts. This method provides cooling to the TBC, but does not allow for a thicker layer of TBC. The above cited prior art references show airfoils with TBC layers that are cooled by air, but do not allow for a thicker layer that will result in spallation.

It is therefore an object of the present invention to allow for a thicker layer of the TBC to be applied that will not chip or break away (spallation) due to the thermal stresses developed in the layer.

It is another object of the present invention to provide for cooling of the TBC such that if a piece of the TBC was to break away (spallation) the remaining exposed part will be cooled by passing cooling air through the resulting hole to limit infusion of the hot gas flow.

It is another object of the present invention to provide for a turbine airfoil with a thicker TBC and a cooling hole that will provide cooling to the airfoil if a piece of the TBC was to break away.

It is another object of the present invention to provide for a method of making a turbine airfoil with a reinforced TBC applied thereto the airfoil.

BRIEF SUMMARY OF THE INVENTION

The present invention is a TBC applied to a substrate that is exposed to a very high temperature environment in which a TBC is required to prevent thermal damage to the substrate. The substrate is formed with ribs on the external surface that are in a cross hatching arrangement and form square shaped cells or openings with a wire passing through the cells in a chordwise direction. A TBC is sprayed into the cells and covers the wire to form the layer of TBC over the airfoil surface. The wire functions to hold the thicker TBC in the cells and acts as reinforcement. As the airfoil heat up from the thermal exposure, the side walls of the cells compress the TBC and also function to hold the TBC together. A turbine airfoil includes the cells with the reinforcement wire extending through adjacent cells in which a TBC is applied into the cells to form a layer of TBC over the airfoil surface.

DETAILED DESCRIPTION OF THE INVENTION

Figure 1:
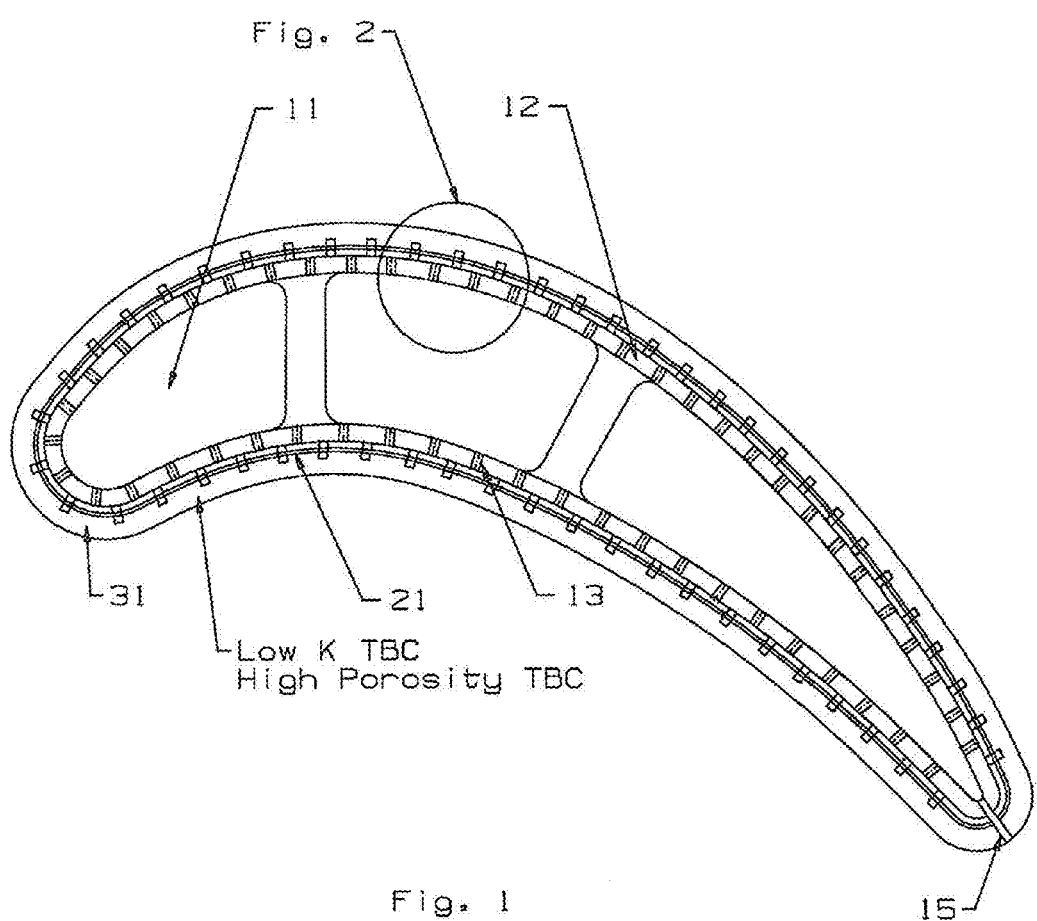
FIG. 1 shows a top view of a cross section of a turbine airfoil of the present invention.
Figures 2, 3:
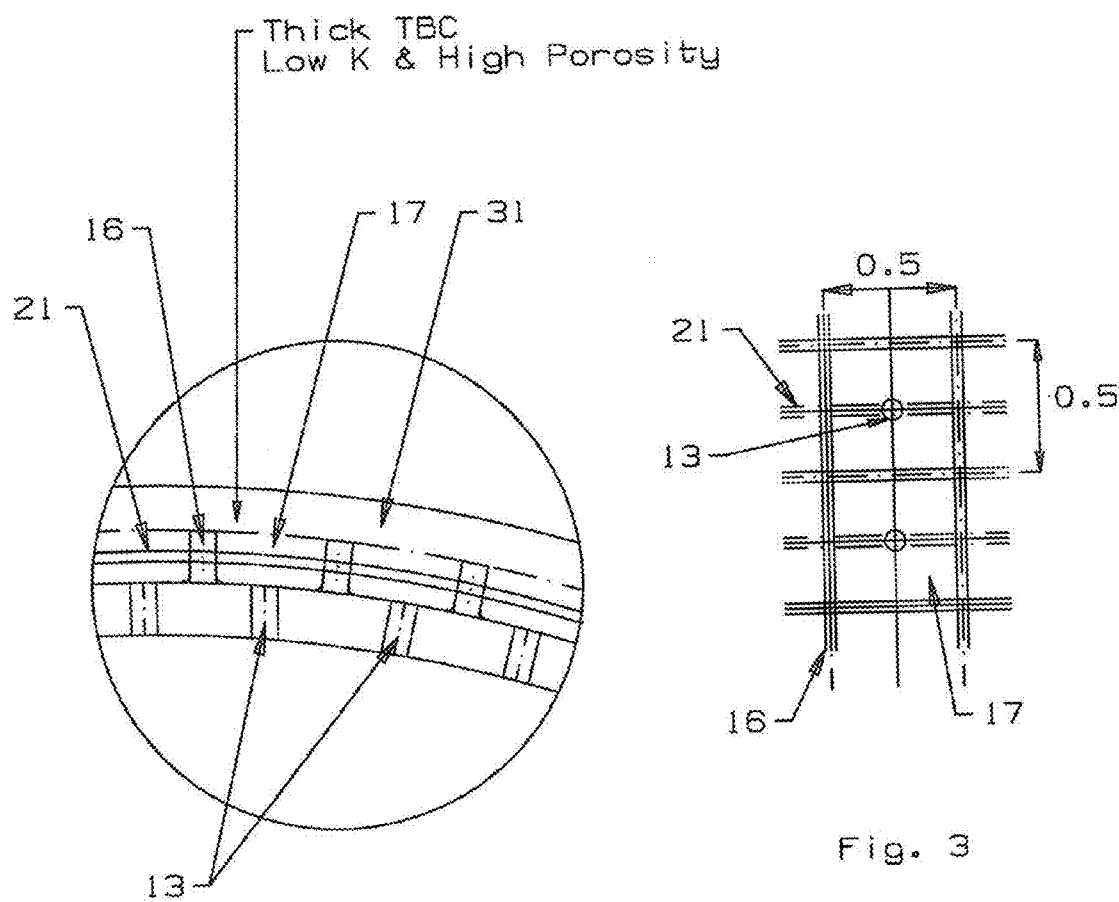
FIG. 2 shows a detailed view of a cross section of the airfoil wall of the present invention in FIG. 1.
FIG. 3 shows a side view of a portion of the airfoil wall of FIG. 1.

The present invention is a turbine airfoil, such as a rotor blade or a stator vane, with a TBC (thermal barrier coating) applied to the external surfaces. However, the present invention can be applied to any structure or substrate that requires a thermal barrier coating to protect the substrate from the extremely high temperature environment which warrants the TBC. FIG. 1 shows a cross section view from the top of a turbine airfoil of the present invention. This turbine airfoil includes a plurality of cooling air supply cavities 11 or channels separated from each other by ribs that extend from the pressure side wall to the suction side wall. The airfoil spar 12 forms the substrate for the TBC 31 which is applied over to form the airfoil surface. The open cells or pockets are formed by ribs 16 that extend in the chordwise direction and in the spanwise direction to form square shaped cells or pockets as seen in FIGS. 2 and 3. Also formed within the airfoil spar 12 are a plurality of cooling air feed holes 13 in which at least one hole 13 opens into each cell. The cooling holes pass cooling air from the cavity to the cell.

FIG. 2 shows a cross section side view of a detailed portion of the airfoil spar 12 with the cooling air holes 13 opening into the cells formed between the ribs 16. A wire band 21 passes across adjacent cells through cross-over holes that are formed in the ribs 16. The height of the ribs is about 0.3 inches and form square shaped cells that are about 0.5 inches by 0.5 inches from side to side. The ribs have a thickness of about 0.1 inches. The wire band 21 is formed of a heat resistant material like that which the airfoil spar is made from and has a diameter of about 0.1 inches. The cross-over holes in the ribs 16 in which the wire band 21 passes through are drilled into the ribs 16 after the airfoil spar has been formed typically by casting.

A TBC is sprayed into the cells with the wire band 21 therein to form a TBC 17 within the cells and at a height above the tips of the ribs 16. A small amount of air flowing through the cell floor while the TBC is being sprayed into the cells will prevent the TBC from accumulating around the cell floor holes and block the holes. The TBC completely surrounds the wire band 21 such that the wire band 21 functions to reinforce the TBC. The height of the TBC extends over the rib tip by about 0.05 inches. The TBC is a low K and high porosity material such that cooling air passing through the holes 13 in the cell floor will pass through the TBC and out the surface. If the TBC breaks away and leave an opening that is exposed to the hot gas flow, the exposed hole will pass cooling air out from the spar and into the exposed hole to provide cooling and prevent damage to the airfoil spar.

The cells are shown as being substantially square shaped. However, any shape could be used such as rectangular in which one side is longer than the adjacent side, or oval in shape. Also, the embodiment shown in FIGS. 2 and 3 shows a single cooling hole 13 opening into the cell. However, more than one cooling hole could be used depending upon the size of the cell and the size of the cooling holes. Also, the ribs are shown to have sides that are substantially parallel. However, the ribs can have a slight taper such that the top is narrower than the bottom.

The advantages of the present invention are numerous and explained below. The new TBC attachment method will allow for a much thicker TBC to be used than the prior art TBC methods. This will allow for a higher reduction of airfoil metal temperature or higher reduction of cooling flow savings. The use of the wire band allows for a physical retaining of a thicker TBC. The series of coating cells will increase the total bonding surface area for the TBC. During engine operation, the ribs in the attachment cells are at compression against the TBC which will prolong the TBC endurance limit. The metal ribs heat up and expand which places the TBC within the cell in compression. Cooling airs is metered through the metering holes in the cell floor and are built in to the spar. This allows for tailoring the cooling flow based on the airfoil heat load. The individual cells in combination with ea high porosity TBC will allow for the cooling air to be distributed within each cell area uniformly and therefore achieve a transpiration type of cooling design application which yields a very high film cooling effectiveness level.

I claim:

1. A TBC covered substrate comprising:
    a plurality of open cells formed in the substrate, the open cells having a floor and side walls defining the open cell;
    cross-over holes in the cell walls;
    a wire band extending through the cross-over holes and across the cells; and,
    a TBC filling the cells and covering the wire band.

2. The TBC covered substrate of claim 1, and further comprising:
    the cross-over holes extend through the cell walls at about the mid-point of the wall.

3. The TBC covered substrate of claim 1, and further comprising:
    the cell walls are formed by ribs having a width at the cross-over holes, and a ratio of the cell width to the rib width is about 5:1.

4. The TBC covered substrate of claim 1, and further comprising:
    the cells are substantially rectangular in shape.

5. The TBC covered substrate of claim 1, and further comprising:
    the floor of the cells has at least one cooling air feed hole.

6. The TBC covered substrate of claim 5, and further comprising:
    the TBC is a porous material such that cooling air passing through the at least one cooling air feed hole will pass through the TBC.

7. The TBC covered substrate of claim 1, and further comprising:
    the TBC also covers the cell wall tips.

8. A turbine airfoil with a TBC applied thereto, the airfoil comprising:
    A spar having a plurality of open cells formed by ribs;
    the ribs having a cross-over hole;
    a wire band passing through the cross-over holes and through the cells; and,
    a TBC applied to the spar to fill the cells and cover the wire band such that the wire band provides reinforcement to the TBC.

9. The turbine airfoil of claim 8, and further comprising:
    the cross-over holes extend through the cell ribs at about the mid-point of the rib.

10. The turbine airfoil of claim 8, and further comprising:
    the cells are substantially rectangular in shape.

11. The turbine airfoil of claim 8, and further comprising:
    the floor of the cells has at least one cooling air feed hole.

12. The turbine airfoil of claim 11, and further comprising:
    the TBC is a porous material such that cooling air passing through the at least one cooling air feed hole will pass through the TBC.

13. The turbine airfoil of claim 8, and further comprising:
    the TBC also covers the cell wall tips.

14. The turbine airfoil of claim 12, and further comprising:
    the cells have a width of about 0.5 inches by 0.5 inches and a cell wall height of about 0.3 inches.

15. A process for making a TBC covered turbine airfoil for use in a gas turbine engine, the process comprising the steps of:

forming the airfoil spar with a plurality of open cells;

forming cross-over holes within the walls of the cells;

placing a wire band through the cross-over holes and through the cells; and, spraying a TBC into the open cells to cover the wire band and fill the cells.

16. The process for making a TBC covered turbine airfoil of claim 15, and further comprising the step of:

forming at least one cooling air feed hole in the floor of each cell.

17. The process for making a TBC covered turbine airfoil of claim 16, and further comprising the step of:

the step of spraying the TBC includes spraying a porous TBC into the cell such that cooling air passing through the cooling air feed holes will pass through the TBC.

18. The process for making a TBC covered turbine airfoil of claim 16, and further comprising the step of:

passing air through the cooling air feed holes while applying the TBC such that the TBC does not block the cooling air feed hole.

\* \* \* \* \*